United States Patent
Wei et al.

(10) Patent No.: US 9,277,566 B2
(45) Date of Patent: Mar. 1, 2016

(54) CROSS-SUBFRAME CONTROL CHANNEL DESIGN

(75) Inventors: Yongbin Wei, San Diego, CA (US); Durga Prasad Malladi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 12/879,731

(22) Filed: Sep. 10, 2010

(65) Prior Publication Data

US 2011/0064037 A1 Mar. 17, 2011

Related U.S. Application Data

(60) Provisional application No. 61/242,303, filed on Sep. 14, 2009.

(51) Int. Cl.
*H04W 4/00* (2009.01)
*H04W 72/12* (2009.01)
*H04L 5/00* (2006.01)

(52) U.S. Cl.
CPC ......... *H04W 72/1289* (2013.01); *H04L 5/0035* (2013.01); *H04W 72/1273* (2013.01)

(58) Field of Classification Search
CPC .......................... H04L 5/0035; H04W 72/042
USPC ......... 370/328–330, 341, 342, 436, 437, 441; 455/450–452.2, 509
See application file for complete search history.

(56) References Cited

U.S. PATENT DOCUMENTS

| 4,857,863 A | 8/1989 | Ganger et al. |
| 5,051,625 A | 9/1991 | Ikeda et al. |
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |

(Continued)

FOREIGN PATENT DOCUMENTS

| CN | 1311968 A | 9/2001 |
| CN | 101018220 A | 8/2007 |

(Continued)

OTHER PUBLICATIONS

3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009, pp. 1-17, XP050377589.

(Continued)

*Primary Examiner* — David Oveissi (74) *Attorney, Agent, or Firm* — Anthony R. Morris (57) ABSTRACT

Certain aspects of the disclosure relate to performing cross-subframe control channel signaling for wireless communications. A method may be provided for signaling downlink control channel resource allocations and/or physical control format indications in a subframe different from the subframe in which a downlink data transmission may be performed. In one aspect, the method may include transmitting PDCCH and/or PCFICH during a first subframe to allocate resources for a PDSCH during a second subframe and transmitting the PDSCH during the second subframe.

40 Claims, 5 Drawing Sheets

(56) References Cited

U.S. PATENT DOCUMENTS

| | | |
|---|---|---|
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,151,492 A | 11/2000 | Melin |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2* | 4/2012 | Chun et al. .................... 370/329 |
| 8,174,995 B2 | 5/2012 | Malladi |
| 8,228,827 B2 | 7/2012 | Jeong et al. |
| 8,363,697 B2 | 1/2013 | Grob et al. |
| 8,446,869 B2 | 5/2013 | Lee et al. |
| 2003/0043928 A1 | 3/2003 | Ling et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer, III |
| 2006/0166693 A1 | 7/2006 | Jeong et al. |
| 2007/0064669 A1* | 3/2007 | Classon et al. ................ 370/347 |
| 2007/0087691 A1* | 4/2007 | Lee et al. ..................... 455/13.2 |
| 2007/0104166 A1 | 5/2007 | Rahman et al. |
| 2007/0153719 A1 | 7/2007 | Gopal |
| 2007/0167181 A1 | 7/2007 | Ramesh et al. |
| 2007/0232327 A1 | 10/2007 | Li et al. |
| 2007/0253355 A1 | 11/2007 | Hande et al. |
| 2008/0008212 A1 | 1/2008 | Wang et al. |
| 2008/0013500 A1 | 1/2008 | Laroia et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0219236 A1* | 9/2008 | Love et al. .................... 370/347 |
| 2008/0220791 A1* | 9/2008 | Cho et al. ...................... 455/450 |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1 | 10/2008 | Periyalwar et al. |
| 2008/0260062 A1 | 10/2008 | Imamura |
| 2008/0268859 A1 | 10/2008 | Lee et al. |
| 2008/0285513 A1* | 11/2008 | Jung et al. .................... 370/329 |
| 2009/0046605 A1 | 2/2009 | Gao et al. |
| 2009/0046674 A1 | 2/2009 | Gao et al. |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1* | 8/2009 | Kawamura et al. ........... 370/330 |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0298498 A1* | 12/2009 | Pisut et al. ..................... 455/434 |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 | 1/2010 | Petrovic et al. |
| 2010/0029282 A1 | 2/2010 | Stamoulis et al. |
| 2010/0034135 A1 | 2/2010 | Kim et al. |
| 2010/0034158 A1 | 2/2010 | Meylan |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0128690 A1 | 5/2010 | McBeath et al. |
| 2010/0144317 A1 | 6/2010 | Jung et al. |
| 2010/0232373 A1* | 9/2010 | Nory et al. .................... 370/329 |
| 2010/0240386 A1 | 9/2010 | Hamabe et al. |
| 2010/0246521 A1 | 9/2010 | Zhang et al. |
| 2010/0254268 A1* | 10/2010 | Kim et al. ..................... 370/328 |
| 2010/0254329 A1* | 10/2010 | Pan et al. ...................... 370/329 |
| 2010/0254344 A1 | 10/2010 | Wei et al. |
| 2010/0260156 A1 | 10/2010 | Lee et al. |
| 2010/0265870 A1* | 10/2010 | Cai et al. ....................... 370/312 |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1* | 12/2010 | Kim et al. ..................... 370/329 |
| 2010/0323611 A1 | 12/2010 | Choudhury |
| 2010/0331030 A1* | 12/2010 | Nory et al. .................... 455/509 |
| 2011/0007673 A1* | 1/2011 | Ahn et al. ..................... 455/509 |
| 2011/0013554 A1 | 1/2011 | Koskinen |
| 2011/0032890 A1* | 2/2011 | Wu ................................ 370/329 |
| 2011/0038271 A1 | 2/2011 | Shin et al. |
| 2011/0044227 A1 | 2/2011 | Harrang et al. |
| 2011/0044261 A1* | 2/2011 | Cai et al. ....................... 370/329 |
| 2011/0051684 A1 | 3/2011 | Li et al. |
| 2011/0053603 A1 | 3/2011 | Luo et al. |
| 2011/0081865 A1 | 4/2011 | Xiao et al. |
| 2011/0116364 A1 | 5/2011 | Zhang et al. |
| 2011/0116437 A1 | 5/2011 | Chen et al. |
| 2011/0134875 A1 | 6/2011 | Ding et al. |
| 2011/0149771 A1 | 6/2011 | Abeta et al. |
| 2011/0149813 A1 | 6/2011 | Parkvall et al. |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |
| 2011/0194514 A1* | 8/2011 | Lee et al. ...................... 370/329 |
| 2011/0199986 A1 | 8/2011 | Fong et al. |
| 2011/0201279 A1 | 8/2011 | Suzuki et al. |
| 2011/0205982 A1 | 8/2011 | Yoo et al. |
| 2011/0211503 A1 | 9/2011 | Che et al. |
| 2011/0243075 A1 | 10/2011 | Luo et al. |
| 2011/0249643 A1 | 10/2011 | Barbieri et al. |
| 2011/0268032 A1* | 11/2011 | Kim et al. ..................... 370/328 |

(56) References Cited

U.S. PATENT DOCUMENTS

| | | | |
|---|---|---|---|
| 2011/0274066 A1* | 11/2011 | Tee et al. | 370/329 |
| 2011/0275394 A1 | 11/2011 | Song et al. | |
| 2011/0310789 A1* | 12/2011 | Hu et al. | 370/315 |
| 2011/0310830 A1 | 12/2011 | Wu et al. | |
| 2011/0317624 A1 | 12/2011 | Luo et al. | |
| 2012/0026892 A1* | 2/2012 | Nakao et al. | 370/242 |
| 2012/0033588 A1 | 2/2012 | Chung et al. | |
| 2012/0033627 A1* | 2/2012 | Li et al. | 370/329 |
| 2012/0033647 A1 | 2/2012 | Moon et al. | |
| 2012/0039180 A1* | 2/2012 | Kim et al. | 370/241 |
| 2012/0039208 A1 | 2/2012 | Aydin | |
| 2012/0087250 A1 | 4/2012 | Song et al. | |
| 2012/0088516 A1 | 4/2012 | Ji et al. | |
| 2012/0093095 A1 | 4/2012 | Barbieri et al. | |
| 2012/0093097 A1 | 4/2012 | Che et al. | |
| 2012/0106481 A1 | 5/2012 | Cho et al. | |
| 2012/0108239 A1 | 5/2012 | Damnjanovic et al. | |
| 2012/0108255 A1 | 5/2012 | Jo et al. | |
| 2012/0155366 A1 | 6/2012 | Zirwas et al. | |
| 2012/0182958 A1 | 7/2012 | Pelletier et al. | |
| 2012/0212260 A1 | 8/2012 | Chen et al. | |
| 2012/0236798 A1 | 9/2012 | Raaf et al. | |
| 2012/0281656 A1 | 11/2012 | Hooli et al. | |
| 2013/0005344 A1 | 1/2013 | Dimou et al. | |
| 2013/0077543 A1 | 3/2013 | Kim et al. | |
| 2013/0077576 A1 | 3/2013 | Abe et al. | |
| 2013/0229933 A1 | 9/2013 | Ji et al. | |
| 2013/0250927 A1 | 9/2013 | Song | |
| 2014/0036838 A1 | 2/2014 | Yoo et al. | |
| 2014/0146798 A1 | 5/2014 | Damnjanovic et al. | |

FOREIGN PATENT DOCUMENTS

| | | |
|---|---|---|
| CN | 101090281 A | 12/2007 |
| CN | 101155399 A | 4/2008 |
| CN | 101262680 A | 9/2008 |
| CN | 101316267 A | 12/2008 |
| CN | 101400130 A | 4/2009 |
| CN | 101483511 A | 7/2009 |
| CN | 101499882 A | 8/2009 |
| CN | 101505498 A | 8/2009 |
| CN | 101686580 A | 3/2010 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2010541492 A | 12/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2013502841 A | 1/2013 |
| KR | 20100018453 A | 2/2010 |
| RU | 2305902 C2 | 9/2007 |
| RU | 2007105748 A | 8/2008 |
| RU | 2369965 C2 | 10/2009 |
| WO | 0111804 A1 | 2/2001 |
| WO | 2004066104 | 8/2004 |
| WO | 2004079949 A1 | 9/2004 |
| WO | 2005019705 A1 | 3/2005 |
| WO | 2005062798 A2 | 7/2005 |
| WO | 2005071867 | 8/2005 |
| WO | WO2005109705 | 11/2005 |
| WO | 2005125053 A1 | 12/2005 |
| WO | 2006020021 A1 | 2/2006 |
| WO | 2006099546 A1 | 9/2006 |
| WO | 2007080892 A1 | 7/2007 |
| WO | 2007097672 A1 | 8/2007 |
| WO | WO2007097671 A1 | 8/2007 |
| WO | WO2007108630 A1 | 9/2007 |
| WO | 2007129537 A1 | 11/2007 |
| WO | 2007129620 A1 | 11/2007 |
| WO | 2008024751 A2 | 2/2008 |
| WO | 2008040448 A1 | 4/2008 |
| WO | 2008041819 A2 | 4/2008 |
| WO | 2008057969 | 5/2008 |
| WO | 2008081816 A1 | 7/2008 |
| WO | 2008086517 | 7/2008 |
| WO | 2008093985 A1 | 8/2008 |
| WO | 2008116128 A2 | 9/2008 |
| WO | 2009011059 A1 | 1/2009 |
| WO | 2009020926 A1 | 2/2009 |
| WO | 2009022295 | 2/2009 |
| WO | WO2009016260 A1 | 2/2009 |
| WO | WO2009022295 | 2/2009 |
| WO | WO2009038367 | 3/2009 |
| WO | 2009043002 | 4/2009 |
| WO | 2009046061 A2 | 4/2009 |
| WO | 2009048246 A2 | 4/2009 |
| WO | WO2009062115 | 5/2009 |
| WO | WO2009064147 A2 | 5/2009 |
| WO | WO2009065075 A1 | 5/2009 |
| WO | 2009067842 A1 | 6/2009 |
| WO | 2009071583 A1 | 6/2009 |
| WO | 2009076803 A1 | 6/2009 |
| WO | WO2009078795 A1 | 6/2009 |
| WO | 2009089798 A1 | 7/2009 |
| WO | WO2009088251 A2 | 7/2009 |
| WO | WO2009096846 A1 | 8/2009 |
| WO | 2009126586 A2 | 10/2009 |
| WO | WO2009152866 A1 | 12/2009 |
| WO | 2010006285 A2 | 1/2010 |
| WO | 2010016607 A1 | 2/2010 |
| WO | WO2010016726 A2 | 2/2010 |
| WO | 2010032791 A1 | 3/2010 |
| WO | WO2010033957 A2 | 3/2010 |
| WO | 2010044903 A2 | 4/2010 |
| WO | WO-2010039738 | 4/2010 |
| WO | 2010110840 A2 | 9/2010 |
| WO | WO2011034966 A1 | 3/2011 |

OTHER PUBLICATIONS

3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, no. San Francisco, USA; 20090509, May 9, 2009, pp. 1-34, XP050339706, [retrieved on May 9, 2009].

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.

"3rd Generation Partnership Project; Technical Specification Group Radio Access Network; Evolved Universal Terrestrial Radio Access (E-UTRA) and Evolved Uni versal Terrestrial Radio Access Network (E-UTRAN); Overall description ; Stage 2 (Release 8)" 3GPP Standard; 3GPP TS 36.300, 3rd Generation Partnership Project

(56) References Cited

OTHER PUBLICATIONS (3GPP), Mobile Competence Centre ; 650, Route Des Lucioles ; F-06921 Sophia-Antipolis Cedex ; France, No. V8.8.0, Mar. 1, 2009, pp. 1-157, XP050377583.

Ericsson: "Simultaneous reception of transport channels in the LTE", 3GPP Draft; 36302_CR0009_(REL-8) R2-093578, 3rd Generation Partnership Project (3GPP), Mobile Competence Centre ; 650, Route Des Lucioles ; F-06921 Sophia-Antipolis Cedex ; France, no. San Francisco, USA; 20090509, May 9, 2009, pp. 1-3, XP050340488, [retrieved on May 9, 2009].

LG Electronics Inc: "MAC Random Access Response Extension" 3GPP Draft; R2-085237 MAC RAR Extension, 3rd Generation Partnership Project (3GPP), Mobile Competence Centre ; 650, Route Des Lucioles ; F-06921 Sophia-Antipolis Cedex ; France, no. Prague, Czech Republic; 20080923, Sep. 23, 2008, XP050320136, [retrieved on Sep. 23, 2008] the whole document.

Samsung: "Clarification on the parallel receptions for PDSCHs", 3GPP Draft; 36302_CR0010 (REL-8) R2-093579, 3rd Generation Partnership Project (3GPP), Mobile Competence Centre ; 650, Route Des Lucioles ; F-06921 Sophia-Antipolis Cedex ; France, no. San Francisco, USA; 20090519, May 19, 2009, pp. 1-2, XP050340489, [retrieved on May 19, 2009].

Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, no. Shenzhen, China; 20090824, Aug. 24, 2009, XP050388168, [retrieved on Aug. 22, 2009].

Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; 20100222, Feb. 16, 2010, XP050418951, [retrieved on Feb. 16, 2010].

Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, no. Athens, Greece, 20090206, Feb. 6, 2009, XP050318788.

Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL 1/TSGR1_61/Docs/ [retrieved on Sep. 30, 2011].

Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010, XP050418632, [retrieved on Feb. 16, 2010].

Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, Beijing, china; 20100412, Apr. 6, 2010, XP050419318, [retrieved on Apr. 6, 2010].

3GPP: "3rd Generation Partnership Project; Technical Specification Group Radio Access Network; Evolved Universal Terrestria Radio Access (E-UTRA); Physical 1 ayer procedures (Rel ease 8)" 3GPP TS 36.213 V8.7.0 (May 2009) Technical Specification, No. V8.7.0, Jun. 8, 2009, pp. 1-77, XP002602609.

3GPP TS 36.331 V8.5.0, Radio Resource Control (RRC); Protocol specification (Release 8), 204 pages, 2009.

Alcatel-Lucent Shanghai Bell et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, no. Los Angeles, USA; Jun. 24, 2009, XP050350848, [retrieved on Jun. 24, 2009].

Ericsson: 3GPP Draft; R3-083577, 3rd Generation Partnership Project (3GPP), Mobile Competence Centre ; 650, Route Des Lucioles ; F-06921 Sophia-Antipolis Cedex ; France, no. Prague, Czech Republic; 20081125, Nov. 25, 2008, XP050324756 [retrieved on Nov. 25, 2008] Section 10.1.5.1.

Ericsson: "Structure of System Information", TSGR2#4(99)414, 5 pages, May 1999.

Gale et al., "Distributed discreate resource optimization in Heterogeneous networks". 2008, pp. 560-564, IEEE 04641670.

Garcia F., et al.,"Design of a slew rate controlled output buffer", ASIC Conference 1998. Proceedings. Eleventh Annual IEEE International Rochester, NY, USA Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.

Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, no. Los Angeles, USA, Jun. 24, 2009, XP050350879, [retrieved on Jun. 24, 2009].

Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351434 [retrieved on Aug. 18, 2009] p. 1, paragraph 1.

Inoue et al., "Space time transmit site diversity for OFDM multi base station system", 2002, pp. 30-34, IEEE 01045691.

International Search Report and Written Opinion—PCT/US2010/048654—International Search Authority, European Patent Office,Nov. 5, 2010.

Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351718 [retrieved on Aug. 18, 2009] p. 1, paragraph 1-paragraph 2.

Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; 20090508, May 8, 2009, XP050339658, [retrieved on May 8, 2009].

Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.

Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, no. Shenzhen, China; 20090819, Aug. 19, 2009, XP050351683 [retrieved on Aug. 19, 2009] p. 1, paragraph 1.

Samsung: "Inbound mobility to H(e)NBs" 3GPP Draft; R2-093250_Inbound Mobility to H(e)NBs-R4, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050340933 [retrieved on Apr. 28, 2009] the whole document.

Vice Chairman: "Report of E-UTRA control plane session" 3GPP Draft; R2-082841—Chair-Report-RAN2-62-LTE-CP, 3rd Generation Partnership Project (3GPP), Mobile Competence Centre ; 650, Route Des Lucioles ; F-06921 Sophia-Antipolis Cedex ; France, vol. RAN WG2, no. Kansas City, USA; 20080514, May 14, 2008, XP050140403 [retrieved on May 14, 2008].

3GPP TS 36.355 V9.0.0, Technical Specification Group Radio Access Network, E-UTRA, "LTE Positioning Protocal (LLP) (Release 9)" Dec. 2009, 31 pages.

3GPP: "LS on RV Determination for BCCH," 3GPP TSG RAN WG1 Meeting #54bis, Sep. 29, 2008, R1-084067, <URL: http://www.3gpp.org/ftp/tsg_ran/WG1_RL1/TSGR1_54b/Docs/R1-084067.zip>.

3GPP TSG-RAN WG2 Meeting #68 R2-096531, "Email discussion on MBMS value range [67b#14]", Nov. 9-13, 2009, Jeju, Korea, (56) References Cited

OTHER PUBLICATIONS

Discussion and Decision, <URL: http://www.3gpp.org/ftp/tsg_ran/WG2_RL2/TSGR2_68/Docs/R2-096531.zip>, p. No. 1-13.
Alcatel-Lucent, "Interference Coordination Framework with Results", 3GPP TSG RAN WG1 Meeting #49bis, R1-07-3187, Jun. 29, 2007, pp. 1-9.
Catt,Addition of MBSFN information on X2 interface,[online],3GPPTSG-RAN3 Meeting #64,May 4, 2009,R3-091247, Internet<URL:http://www.3gpp.org/ftp/tsg_ran/WG3_lu/TSGR3_64/Docs/R3-091247.zip>, p. No. 1-14.
Huawei, "Consideration on CSI-RS design for CoMP and text proposal to 36.814", 3GPP TSG-RAN WG1#57b R1-092364, Los Angeles, USA, Jun. 29-Jul. 3, 2009.
LG Electronics: "Coordination for DL control channel in co-channel HeNB deployment", 3GPP Draft; R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; 20100412, Apr. 6, 2010, XP050419640, [retrieved on Apr. 6, 2010].
Motorola: "DCI Format 1C with implicit RV and TBS," 3GPP TSG RAN1 #54, Aug. 18, 2008, R1-083207, 5 pages, <URL: http://www.3gpp.org/ftp/tsg_ran/WG1_RL1/TSGR1_54/Docs/R1-083207.zip>.
NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; 20100412, Apr. 7, 2010, XP050419698, [retrieved on Apr. 7, 2010].
NTT DOCOMO, "Performance Evaluations of Heterogeneous Networks", 3GPP TSG RAN WG1 Meeting #60, R1-101226, Feb. 26, 2010, pp. 1-18.
Qualcomm Europe: "Coordinated Multi-Point downlink transmission in LTE-Advanced" 3GPP Draft; R1-084400 COMP, 3rd Generation Partnership Project (3GPP), Mobile Competence Centre; 650, Route Des Lucioles ; F-06921 Sophia-Antipolis Cedex; France, no. Prague, Czech Republic; 20081105, Nov. 5, 2008, XP050317663.
Taiwan Search Report—TW099131096—TIPO—Mar. 31, 2014.
Gaie C., et al., "Distributed Discrete Resource Optimization in Heterogeneous Networks," IEEE, 2008, pp. 560-564.
3GPP TS 36.355 V9.0.0, LTE Positioning Protocol (LPP), Dec. 2009, http://www.3gpp.org/ftp/Specs/archive/36_series/36.355/36355-900.zip 3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.
Interdigital Communications: "eICIC Macro-Femto: Time-domain muting and ABS", 3GPP TSG-RAN WG1#63, R1-105951, Nov. 15, 2010, 6 Pages, URL: http://www.3gpp.org/ftp/tsg_ran/WG1_RL1/TSGR1_63/Docs/R1-105951.zip.
LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGl, no. San Francisco, USA; 20100222-20100226, Feb. 16, 2010, XP050418854, pp. 1-5.
LG-Nortel: "Interference under Type 1 RN", 3GPP TSG-RAN WG1#57, R1-092184, 14 pages, May 4, 2009.
NTT DOCOMO: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010, XP050418740, [retrieved on Feb. 16, 2010]., p. 1-8.
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, no. Ljubljana, 20090107, Jan. 7, 2009, XP050318205, pp. 1-5, [retrieved on Jan. 7, 2009].
Huawei et al., "The possible restrictions on the configuration of almost blank subframes in Macro-Pico deployments", 3GPP Draft; R1-105150 The Possible Restrictions on the Configuration of Almost Blank Subframes in Macro-Pi Co Deployments_ VO 5, 3rd Generation Partnership Project (3GPP), Mobile Competence Centre ; 650, Route Des Lucioles ; F-06921 Sophia-Antipolis CE, vol. RAN WG1, Oct. 5, 2010, XP050450368, pp. 1-5.
Ericsson, Considerations on Non-CA based Heterogeneous Deployments, 3GPP TSG-RAN WG1 #61, R1-102618, ST-Ericsson, 2010, 3 Pages.
LG Electronics, Coordination for DL Control Channel in Co-Channel CSG Deployment, 3GPP TSG RAN WG1 Meeting #61, R1-102704, 2010, 8 Pages.
Motorola: "HeNB Interference Management", 3GPP TSG-RAN WG1#60 R1-101121, <URL:http://www.3gpp.org/ftp/tsg_ran/WG1_RL1/TSGR1_60/Docs/R1-101121.zip>, Feb. 17, 2010, 4 Pages.
Nortel: "Discussions on LTE mobility performance evaluation", 3GPP TSG-RAN WG1#57 R1-091913, <URL:http://www.3gpp.org/ftp/tsg_ran/WG1_RL1/TSGR1_57/Docs/R1-091913.zip>, May 9, 2009, 3 Pages.
Qualcomm Incorporated: "Measurements and feedback extensions for improved operations in HetNets", 3GPP TSG-RAN WG1#60b R1-102353, <URL:http://www.3gpp.org/ftp/tsg_ran/WG1_RL1/TSGR1_60b/Docs/R1-102353.zip>, Apr. 6, 2010, 3 Pages.
TSG-RAN WG4: "Reply to LS on mobility evaluation" 3GPP TSG-RAN WG4#50bis R4-091518, <URL:http://www.3gpp.org/ftp/tsg_ran/WG4_Radio/TSGR4_50bis/Documents/R4-091518.zip>, Mar. 30, 2009, 3 Pages.
ZTE: "Scenarios and Specification Impact of Type 2 Relay", 3GPP TSG-RAN WG1#60 R1-100979, <URL: http://www.3gpp.org/ftp/tsg_ran/WG1_RL1/TSGR1_60/Docs/R1-100979.zip>, Feb. 16, 2010, 7 Pages.
Lopez-Perez D., et al., "OFDMA femtocells: A roadmap on interference avoidance", IEEE Communications Magazine, IEEE Service Center, Piscataway, US, vol. 47, No. 9, Sep. 1, 2009, pp. 41-48, XP011283364, ISSN: 0163-6804, DOI: 10.1109/MCOM.2009.5277454.
3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2005) Technical Specification, No. V8.7.0, Jun. 8, 2009, pp. 1-77, XP002602609.
3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre; 650, Route des Lucioles; F-06921 Sophia-Antipolis Cedex; France, No. V8.1.0, Mar. 1, 2009, pp. 1-17, XP050377589.
3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre; 650, Route des Lucioles; F-06921 Sophia-Antipolis Cedex; France, No. San Francisco, USA; 20090509, May 9, 2009, pp. 1-34, XP050339706, [retrieved on May 9, 2009].
3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.5.0" 3GPP TS 36.321 V8.5.0, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.
"3rd Generation Partnership Project; Technical Specification Group Radio Access Network; Evolved Universal Terrestrial Radio Access (E-UTRA) and Evolved Uni versal Terrestrial Radio Access Network (E-UTRAN); Overall description; Stage 2 (Release 8)" 3GPP (56) References Cited

OTHER PUBLICATIONS

Standard; 3GPP TS 36.300, 3rd Generation Partnership Project (3GPP), Mobile Competence Centre; 650, Route des Lucioles; F-06921 Sophia-Antipolis Cedex; France, No. V8.8.0, Mar. 1, 2009, pp. 1-157, XP050377583.
Ericsson: 3GPP Draft; R3-083577, 3rd Generation Partnership Project (3GPP), Mobile Competence Centre; 650, Route des Lucioles; F-06921 Sophia-Antipolis Cedex; France, No. Prague, Czech Republic; 20081125, Nov. 25, 2008, XP050324756 [retrieved on Nov. 11, 2008] Section 10.1.5.1.
Ericsson: "Simultaneous reception of transport channels in the LTE", 3GPP Draft; 36302_CR0009 (Rel-8) R2-093578, 3rd Generation Partnership Project (3GPP), Mobile Competence Centre; 650, Route des Lucioles; F-06921 Sophia-Antipolis Cedex; France, No. San Francisco, USA; 20090509, May 9, 2009, pp. 1-3, XP050340488, [retrieved on May 9, 2009].
Huawei: "R-PDCCH Design" 3GPP Draft; R1-093042 R-PDCCH Design, 3rd Generation Partnership Project (3GPP), Mobile Competence Centre; 650, Route des Lucioles; F-06921 Sophia-Antipolis Cedex; France, No. Shenzhen, China; 20090818, Aug. 18, 2009, XP050351434 [retrieved on Aug. 18, 2009] p. 1, paragraph 1.
International Search Report and Written Opinion -PCT/US2010/048654- International Search Authority, European Patent Office, Nov. 5, 2010.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre; 650, Route des Lucioles ; F-06921 Sophia-Antipolis Cedex; France, No. Prague, Czech Republic; 20080923, Sep. 23, 2008, XP050320136, [retrieved on Sep. 23, 2009] the whole document.
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre; 650, Route des Lucioles; F-06921 Sophia-Antipolis Cedex; France, No. Shenzhen, China; 20090818, Aug. 18, 2009, XP050351718 [retrieved on Aug. 18, 2009] p. 1, paragraph 1-paragraph 2.
Qualcomm Inc., "Introduction of time domain ICIC", R2-106943, 3GPP TSG-RAN WG2 Meeting #72, Jacksonville, US, Nov. 15-19, 2010, pp. 4.
Qualcomm Inc., "RRM/RLM resource restriction for time domain ICIC", R2-110698, 3GPP TSG-RAN WG2 Meeting #72-bis, Dublin, Ireland, Jan. 17-21, 2011, pp. 8.
Samsung: "Clarification on the parallel receptions for PDSCHs", 3GPP Draft; 36302_CR0010 (Rel-8) R2-093579, 3RD Generation Partnership Project (3GPP), Mobile Competence Centre; 650, Route Des Lucioles; F-06921 Sophia-Antipolis Cedex; France, No. San Francisco, USA; 20090519, May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment In Type I Relay, 3rd Generation Partnership Project (3GPP), Mobile Competence Centre; 650, Route des Lucioles; F-06921 Sophia-Antipolis Cedex; France, No. Shenzhen, China; 20090819, Aug. 19, 2009, XP050351683 [retrieved on Aug. 19, 2009] p. 1, paragraph 1.
Samsung: "Inbound mobility to H(e)NBs" 3GPP Draft; R2-093250 Inbound Mobility to H(E)Nbs-R4, 3rd Generation Partnership Project (3GPP), Mobile Competence Centre; 650, Route des Lucioles; F-06921 Sophia-Antipolis Cedex; France, No. San Francisco, USA; 20090428, Apr. 28, 2009, XP050340933 [retrieved on Apr. 28, 2009] the whole document.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre; 650, Route des Lucioles; F-06921 Sophia-Antipolis Cedex; France, vol. RAN WG2, No. Kansas City, USA; 20080514, May 14, 2008, XP050140403 [retrieved on May 14, 2008].
Young Jin Sang, et al., "A Self-Organized Femtocell for IEEE 802.16e System", Global Telecommunications Conference, 2009. GLOBECOM 2009. IEEE, IEEE, Piscataway, NJ, USA, Nov. 30, 2009, pp. 1-5, XP031646102, ISBN: 978-1-4244-4148-8.

\* cited by examiner

CROSS-SUBFRAME CONTROL CHANNEL DESIGN

CLAIM OF PRIORITY UNDER 35 U.S.C. §119

The present Application for patent claims benefit of Provisional Application Ser. No. 61/242,303, filed Sep. 14, 2009, and assigned to the assignee hereof and hereby expressly incorporated by reference herein.

BACKGROUND

1. Field

Certain aspects of the disclosure generally relate to wireless communications and, more particularly, to a method for control channel signaling in advanced wireless communication systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects provide a method for wireless communications. The method generally includes transmitting control information on a control channel during a first subframe to allocate resources for a downlink data channel during a second subframe, and transmitting the downlink data channel during the second subframe.

Certain aspects provide a method for wireless communications. The method generally includes receiving control information on a control channel during a first subframe, the control information allocating resources for a downlink data channel during a second subframe, and receiving the downlink data channel during the second subframe.

Certain aspects provide an apparatus for wireless communications. The apparatus generally includes means for transmitting control information on a control channel during a first subframe to allocate resources for a downlink data channel during a second subframe; and means for transmitting the downlink data channel during the second subframe.

Certain aspects provide an apparatus for wireless communications. The apparatus generally includes means for receiving control information on a control channel during a first subframe, the control information allocating resources for a downlink data channel during a second subframe; and means for receiving the downlink data channel during the second subframe.

Certain aspects provide an apparatus for wireless communications. The apparatus generally includes at least one processor and a memory coupled to the at least one processor. The at least one processor is generally configured to transmit control information on a control channel during a first subframe to allocate resources for a downlink data channel during a second subframe, and transmit the downlink data channel during the second subframe.

Certain aspects provide an apparatus for wireless communications. The apparatus generally includes at least one processor and a memory coupled to the at least one processor. The at least one processor is generally configured to receive control information on a control channel during a first subframe, the control information allocating resources for a downlink data channel during a second subframe, and receive the downlink data channel during the second subframe.

Certain aspects provide a computer-program product for wireless communications. The computer-program product generally includes a computer-readable medium comprising code for transmitting control information on a control channel during a first subframe to allocate resources for a downlink data channel during a second subframe; and transmitting the downlink data channel during the second subframe.

Certain aspects provide a computer-program product for wireless communications. The computer-program product generally includes a computer-readable medium comprising code for receiving control information on a control channel during a first subframe, the control information allocating resources for a downlink data channel during a second subframe; and receiving the downlink data channel during the second subframe.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), evolved Node B ("eNodeB" or "eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
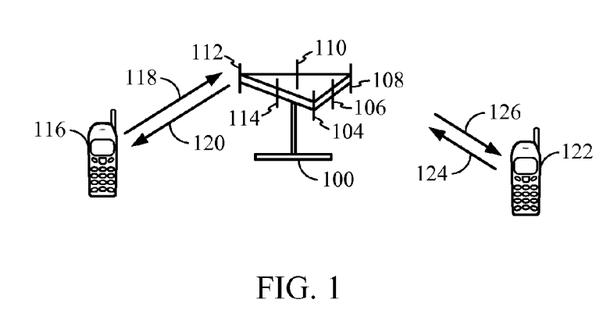
FIG. 1 illustrates an example multiple access wireless communication system in accordance with certain aspects of the disclosure.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
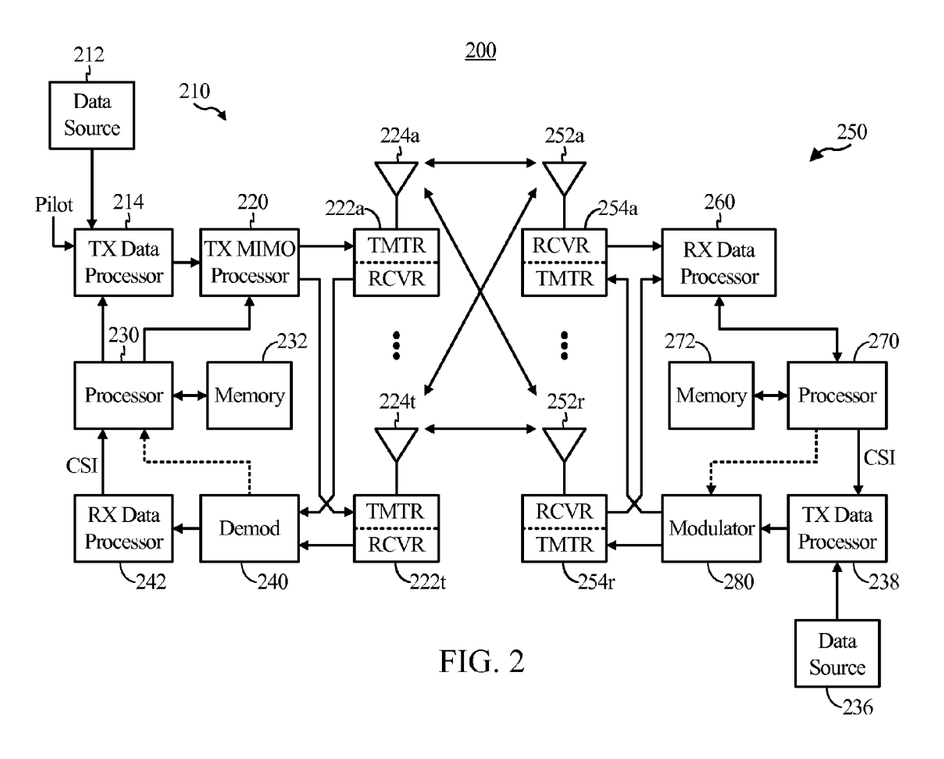
FIG. 2 illustrates a block diagram of an access point and a user terminal in accordance with certain aspects of the disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214. In one aspect, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

A RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

In one aspect, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and uplink (UL) channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Cross-Subframe Control Channel Design

Figure 3:
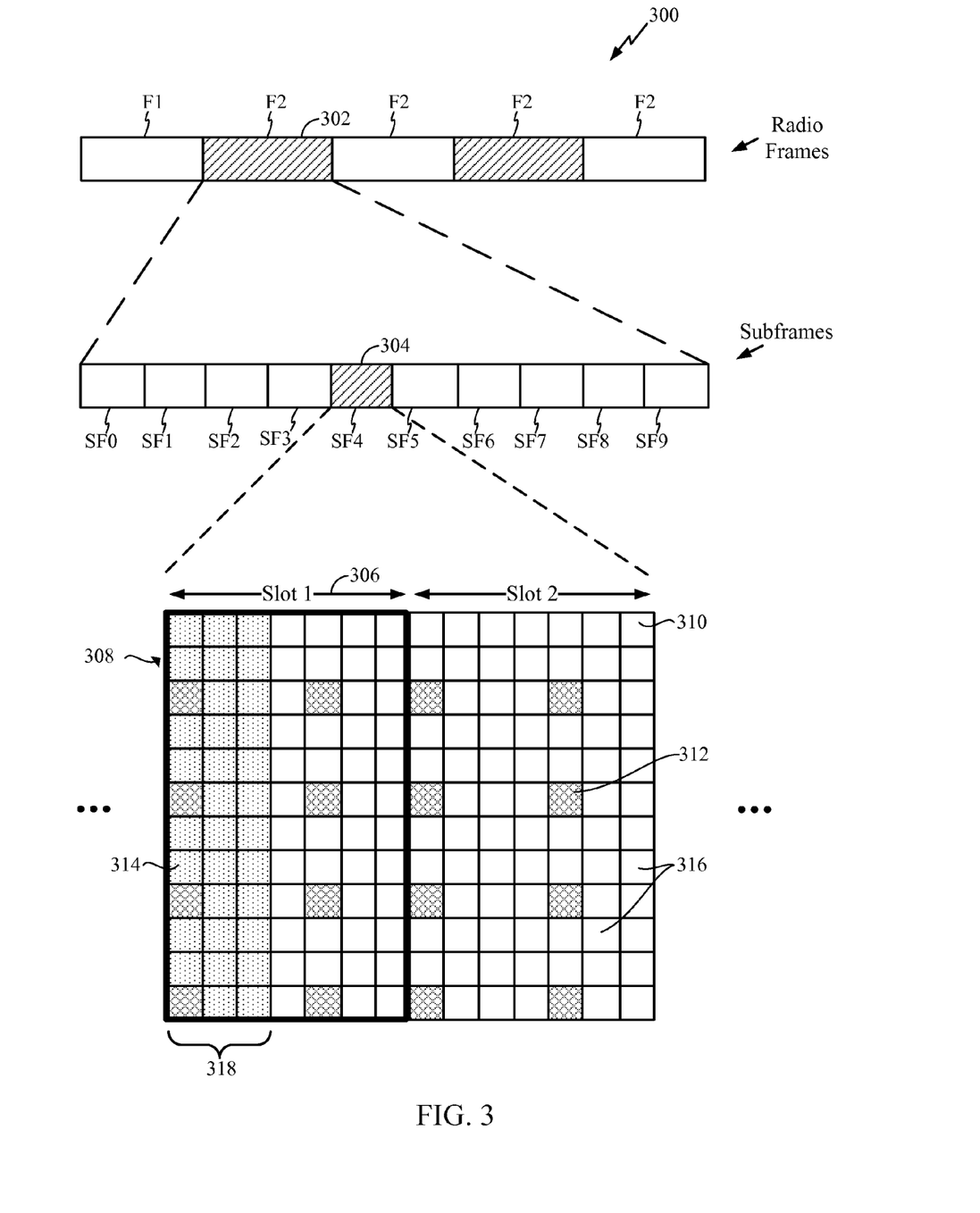
FIG. 3 illustrates an exemplary transmission scheme in accordance with certain aspects of the disclosure.

FIG. 3 illustrates a transmission resource structure that may be used in wireless communications, for example, in release 8 of the LTE standard ("Rel-8"). In one aspect, the transmission resource structure described below may be suitable for FDD. Downlink transmission resources 300 may be partitioned into time units of 10 ms radio frames 302 (denoted as "F1", "F2", etc.) Each radio frame 302 may further be subdivided into ten 1 ms subframes 304 (denoted as "SF0", "SF1", etc.), each subframe split into two 0.5 ms slots 306. Each slot 306 may include seven OFDM symbols in the case of a normal cyclic prefix length, or six OFDM symbols in the case of an extended cyclic prefix. In the frequency domain, transmission resources are grouped in units of 12 subcarriers. One unit of 12 subcarriers for a duration of one slot is known as a Resource Block (RB) 308, and a unit of one subcarrier for a duration of one OFDM symbol is known as a Resource Element (RE) 310.

In another embodiment of a transmission resource structure, this embodiment being suitable for TDD, 10 ms radio frames 302 may comprise two 5 ms half frames, each subframe having five 1 ms subframes 304. The subframes 304 include subframes designated for downlink transmission, subframes designated for uplink transmission, and special subframes comprising a downlink pilot timeslot (DwPTS), an uplink pilot timeslot (UpPTS), and a guard period (GP).

Turning back to FIG. 3, REs 312 may be reserved for special purposes, such as reference signaling. In one aspect, REs 314 may be reserved for transmission of control signaling, such as Physical Downlink Control Channel (PDCCH) or Physical Control Format Indicator Channel (PCFICH). The remaining REs 316 may be primarily used for data transmission, such as Physical Downlink Shared Channel (PDSCH). In one aspect, downlink control channels may be configured to occupy the first 1, 2, or 3 OFDM symbols in a subframe 304, illustrated as a control channel region 318. A PCFICH generally includes a control format indicator (CFI) which indicates the number of OFDM symbols used for transmission of control channel information in each subframe. A PDCCH generally comprises downlink control information (DCI) which may include resource assignments for a UE or a group of UEs. In one aspect, PDCCH may allocate resource blocks in a subframe to PDSCH transmission for a particular UE. PDCCH may be arranged using a variety of message formats (e.g., DCI Format 0, DCI Format 1A, etc.), depending on the network configuration.

According to one aspect, a downlink control channel (e.g., PDCCH) and its associated data channel (e.g., PDSCH) may occupy the same subframe during a downlink transmission. Accordingly, decoding of the received control channel by a UE 250 may be difficult in cases where there is strong interference from neighboring cells.

In one approach, cells may partition a subframe to avoid interference. According to one embodiment, different eNBs 210 may be configured to utilize different subframes in a time-division multiplexing- (TDM-) type of system. Thus, the interference from other cells or transmitters may be avoided by coordinating timing such that different cells transmit and/or receive at different times. In one aspect, a partition may be static, pre-configured, semi-statically or dynamically configured through signaling.

In another approach, an eNB 210 may be configured to perform cross-subframe signaling of control channel resource allocation. An eNB 210 may be configured to signal resource allocation from control channels during subframes different from the subframes during which the associated data channel is sent.

Figure 4:
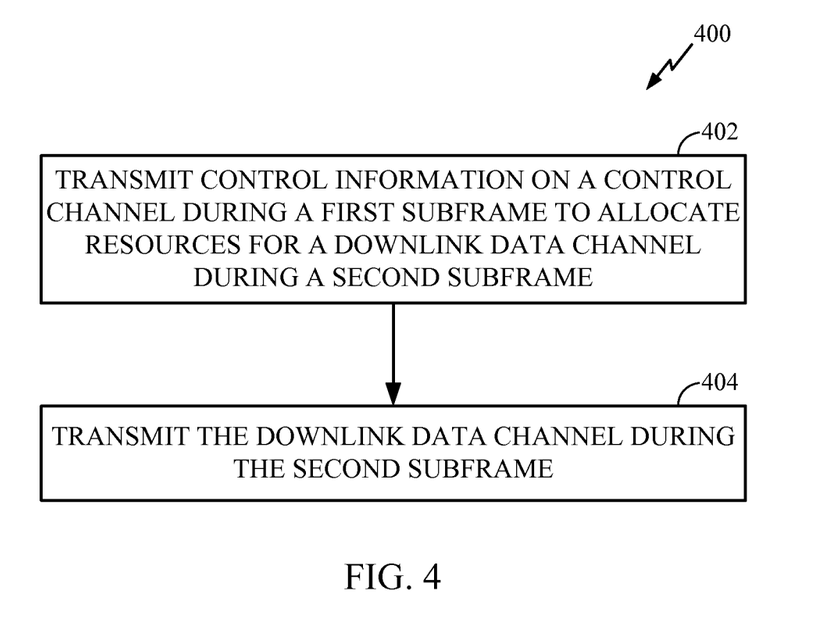
FIG. 4 illustrates an example operation that may be performed by an access point in accordance with certain aspects of the disclosure.

FIG. 4 illustrates exemplary operations 400 that may be performed by an eNB 210 in accordance with aspects of the disclosure. At 402, the eNB 210 may transmit control information on a control channel during a first subframe to allocate resources for a downlink data channel during a second subframe. In one embodiment, processor 230 of eNB 210 may identify a first subframe as subframe n and one or more second subframes as subframe m. The processor 230 may generate control channels (e.g., PCFICH and PDCCH) for transmission during subframe n to signal resource allocation for PDSCH during subframe m. A TX MIMO Processor 220 may transmit the control channels during subframe n. In one aspect, the eNB 210 may signal a number of symbol periods used for control (e.g., PCFICH) during one or multiple subframes m through PDCCH at subframe n.

In one aspect, the eNB 210 may generate control channels comprising bits indicating the allocated resources in the second subframe. For example, an eNB 210 may generate PDCCH having bits, normally reserved in various PDCCH formats, to indicate the target assignment in terms of subframes or interlaces.

In another aspect, the eNB 210 may scramble the control channel using a radio network temporary identifier (RNTI). In one embodiment, the TX MIMO processor 220 of eNB 210 may use a scrambling sequence based on a RNTI value to scramble the PDCCH information. In one aspect, the eNB 210 may scramble PDCCH using a RNTI value reserved for use by Rel-8, for example, hexa-decimal values FFF4-FFFD, as indicated by Table 7.1-1 depicting designated RNTI values for LTE Rel-8.

TABLE 7.1-1

RNTI values from 3GPP TS 36.321

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFD | Reserved for future use |
| FFFE | P-RNTI |
| FFFF | SI-RNTI |

At 404, the eNB 210 may transmit the downlink data channel during the second subframe. In one embodiment, the transmitter MIMO processor 220 may transmit the PDSCH content during subframe m using the allocated resources signaled in subframe n.

In an aspect, the eNB 210 may re-transmit the control information on a control channel during the second subframe. In one embodiment, during the second subframe, the eNB 210 may send control channels (e.g., PCFICH and PDCCH) and data channel (e.g., PDSCH) in the same subframe as a Rel-8 downlink transmission. For example, at subframe m, the eNB 210 may repeat a particular PDCCH for a particular UE 250 or a group of UEs 250, wherein the content of the repeated PDCCH is the same as the PDCCH signaled in subframe n. The eNB 210 may also repeat PCFICH content in subframe m.

Figure 5:
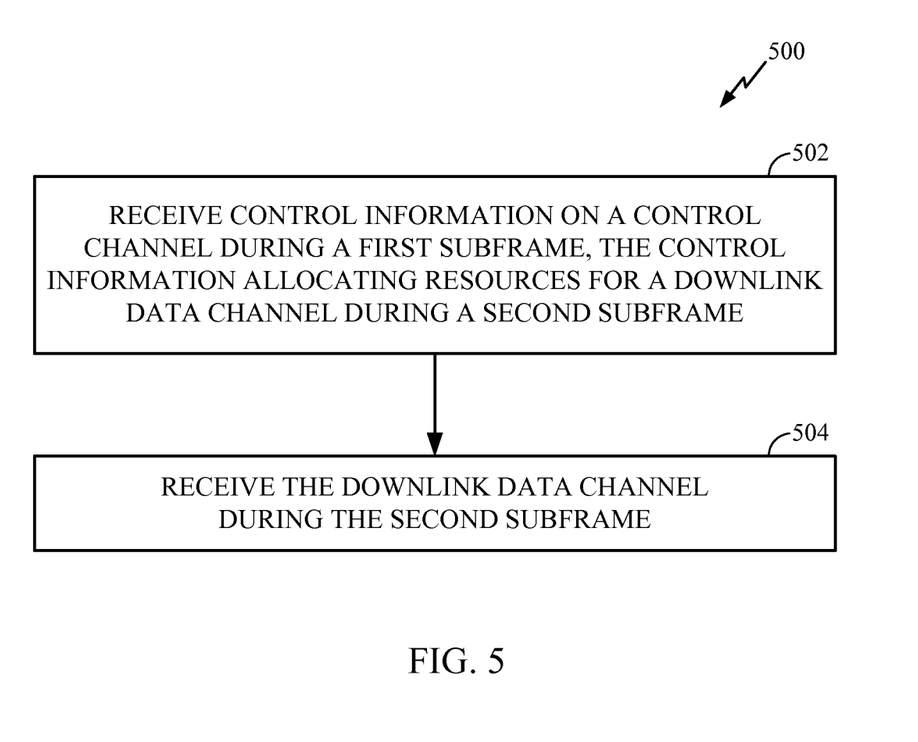
FIG. 5 illustrates an example operation that may be performed by a user terminal in accordance with certain aspects of the disclosure.

FIG. 5 illustrates exemplary operations 500 that may be performed by a UE 250 in accordance with aspects of the disclosure. At 502, the UE 250 receive control information on a control channel during a first subframe, the control information allocating resources for a downlink data channel during a second subframe. In one aspect, the control channel may be further configured to allocate resources for the downlink data channel in at least a third subframe. In one embodiment, RX data processor 260 of UE 250 may receive control channels (e.g., PCFICH and PDCCH) during subframe n that signal resource allocation for PDSCH during subframe m. In one aspect, the UE 250 may receive signaling indicating a number of symbol periods used for control (e.g., PCFICH) during one or multiple subframes m through PDCCH at subframe n.

In one aspect, the UE 250 may receive control channels comprising bits indicating the allocated resources in the second subframe. For example, the UE 250 may receive PDCCH having bits, normally reserved in various PDCCH formats, to indicate the target assignment in terms of subframes or interlaces. In an aspect, some of these reserved bits may be redefined to indicate a future assignment of subframes m to which the PDCCH control information is applied. As such, the UE 250 may be configured to recognize that these bits, normally reserved, may signal a target assignment for the control information.

In an aspect, the UE 250 may decode the control channel to retrieve control signaling and resource allocations. The UE 250 may check cross-subframe bits to determine whether the decoded control channel is for a current subframe n or for another subframe(s) m. If the cross-subframe bits indicate the control channel pertains to the current subframe n, the UE 250 may attempt to decode a downlink data channel, as according to Rel-8. If the cross-subframe bits indicate the control channel pertains to another subframe(s) m, the UE 250 may attempt to decode PDSCH during subframe(s) m.

In one aspect, however, a legacy Rel-8 UE may fail to properly decode the PDCCH. For example, a legacy UE may receive control information in PCFICH, including the redefined bits, indicating a future subframe assignment relating to data in PDSCH in a different subframe. However, the legacy UE may assume that the received control information applies to the same subframe. As such, since there is no associated data channel in the same subframe, the legacy UE may fail its cyclic redundancy check (CRC) and fail to decode the PDCCH. In one aspect, this failed decoding may be utilized advantageously. Because the control information may be intended for a different subframe m, the failed decoding may result in the legacy UE disregarding the received control information during the current subframe n. As such, an embodiment utilizing this aspect may be backward compatible with legacy UE.

In another aspect, the UE 250 may descramble the control channel using a RNTI. In one embodiment, the RX data processor 260 of UE 250 may use a descrambling sequence based on a RNTI value to descramble the PDCCH information. In an aspect, the UE 250 may descramble PDCCH using a RNTI value different from those used in Rel-8, for example, a RNTI value reserved for use by Rel-8. Accordingly, a legacy Rel-8 UE may fail to properly descramble the control channel. As such, the legacy UE may disregard the control channel and the received control information would not be applied to the current subframe n.

At 502, the UE 250 may receive the downlink data channel during the second subframe. In one embodiment, the RX data processor 260 may receive PDSCH content during subframe m using the allocated resources signaled in subframe n.

According to one embodiment, the UE 250 may further receive the control information on a control channel during the second subframe. For example, the UE may receive PDCCH sent in subframe n re-transmitted in subframe m. As described above, legacy UEs may disregard control information receiving during subframe n indicating a cross-subframe allocation of resources. The legacy UE may therefore lack control information for a downlink data channel received in subframe m. As such, a legacy UE may receive re-transmitted PDCCH in subframe m and apply the PDCCH to a PDSCH data channel in subframe m, as according to aspects of Rel-8. Again, an embodiment utilizing this aspect may be backward compatible with legacy UE.

Figure 6:
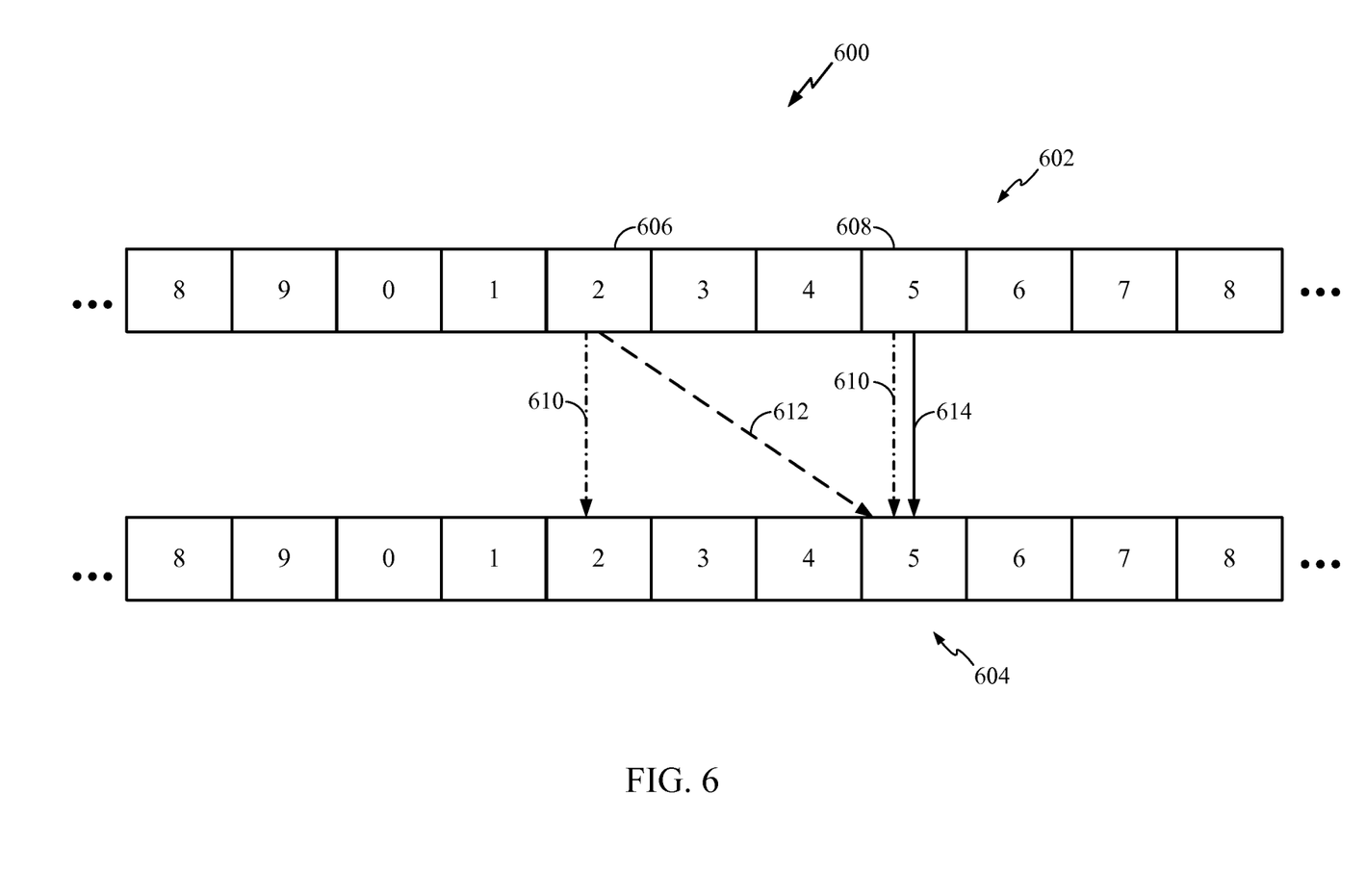
FIG. 6 is a timing diagram illustrating an exemplary transmission in accordance with certain aspects of the disclosure.

FIG. 6 is a timing diagram illustrating an exemplary transmission 600 by an eNB 602 to a UE 604 in accordance with certain aspects of the disclosure. In one example, a system information block (e.g., System Information Block type 1 or "SIB1") may be sent every fifth subframe 608 during even-numbered single frequency network (SFN) radio frames. The SIB1 information may be mapped to a data channel, such as PDSCH. In this example, the UE 604 may need to decode the control information in control channels PCFICH and PDCCH in order to decode the PDSCH. As described above, for eNBs 210 having different power classes, strong interference may make control channel decoding difficult. As such, according to this example, an eNB 602 may utilize a subframe other than the every fifth subframe to signal control information for the fifth subframe. In one aspect, during subframe 606, the eNB 602 may transmit control information 610 to allocate resources for a downlink data channel during the fifth subframe 608 (wherein the assignment is denoted by arrow 612). During subframe 608, the eNB 602 may send the same control information 610 that was transmitted during subframe 606. In one aspect, the eNB 602 may repeat the PDCCH for SIB1 for compatibility with legacy Rel-8 systems. There may be an implicit timing relationship between the cross-subframe grant 612 and the time it is applied by the UE 604. For SIB1, the UE 604 may apply the cross-subframe grant 612 in the immediate SIB1 transmission occasion. The eNB 602 may further transmit the downlink data channel 614 during the fifth subframe 608.

Figure 7:
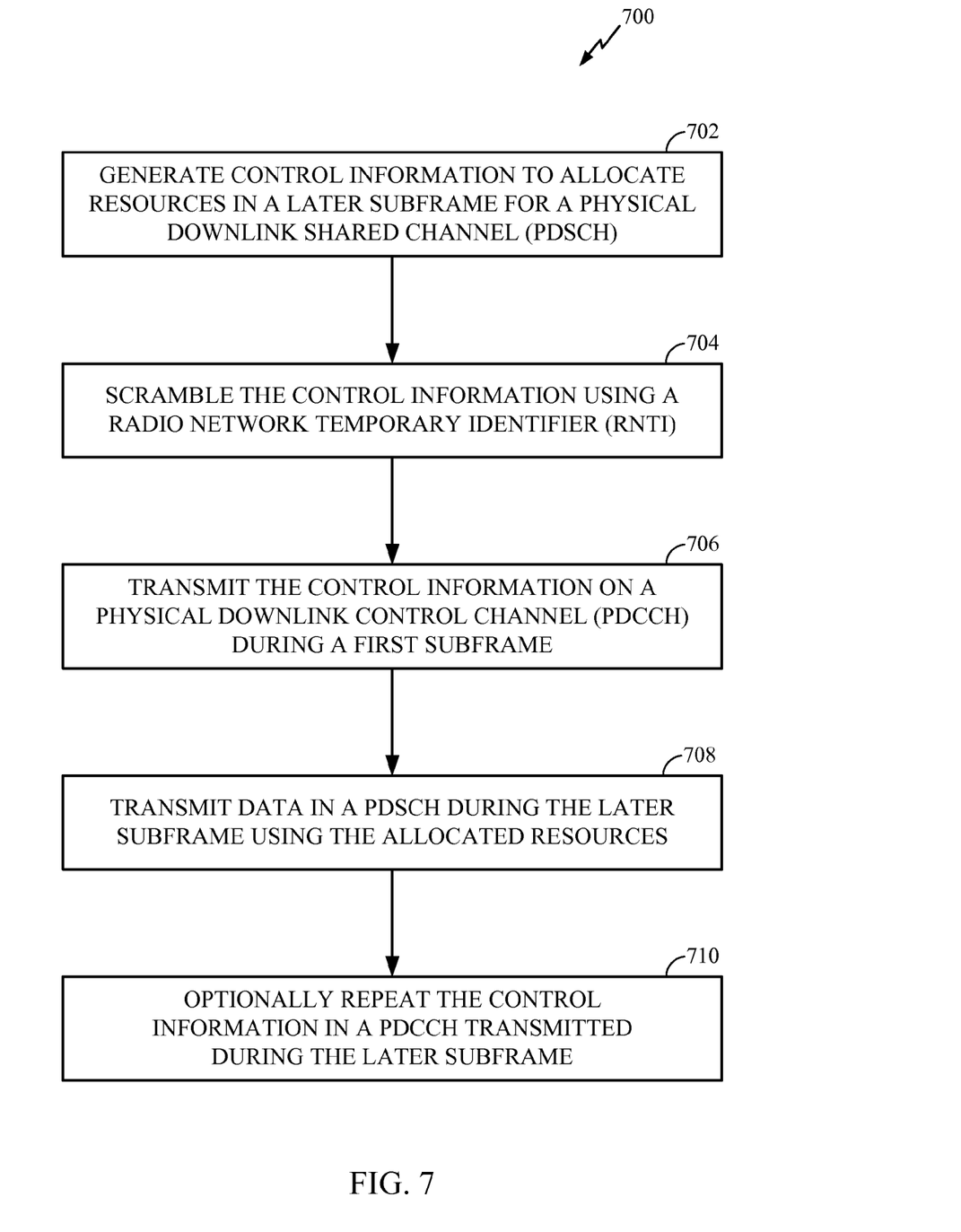
FIG. 7 illustrates an example operation that may be performed by an access point in accordance with certain aspects of the disclosure.

FIG. 7 illustrates exemplary operations 700 that may be performed by an eNB 210 in accordance with aspects of the disclosure. At 702, the eNB 210 may generate control information to allocate resources in a later subframe m for PDSCH. In one aspect, reserved bits in a PDCCH format, such as PDCCH format 1A, may be reused to indicate an assignment in a later subframe m. The assignment may be a cross-subframe assignment and/or a PCFICH value. At 704, the eNB 210 may scramble the control information using a RNTI, wherein the RNTI is a different RNTI value than those used in Rel-8. As such, the scrambled control information may be decoded only by a UE that supports Rel-9 and beyond. At 706, the eNB 210 may transmit the control information on a PDCCH during a first subframe n. At 708, the eNB 210 may transmit data in a PDSCH during the later subframe m using the allocated resources. Additionally, during the later subframe m, the eNB 210 may optionally repeat the control information in a PDCCH transmitted during the later subframe m, at 710.

It is noted that the method for signaling resource allocation using control channels during different subframes other than the subframes where data transmission is sent may be utilized for uplink transmissions. In one aspect, an eNB 210 may transmit control information on a control channel during a third subframe to allocate uplink resources for an uplink transmission during a fourth subframe. The eNB 210 may signal persistently-allocated uplink resources using the control channels during the third subframe. In one aspect, a UE 250 may transmit an uplink data channel using the allocated uplink resources during the fourth subframe. The uplink resources may be persistently allocated in periodic multiples during later subframes.

It is acknowledged that with respect to system and networks elements described herein, language such as "legacy", "Rel-8", "Rel-8-compatible-only", "R8", "older", and similar words may be used with respect to network elements, such as UEs, that support the LTE Release-8 standard but may not support further standards such as LTE Release-9. It is further acknowledged that language such as "non-legacy", "R9", "R9+", "Rel-9", "Rel-9+", "Rel-9 and beyond", or "newer", and similar words may be used with respect to network elements UEs that support at least LTE Release-9 and later releases. Non-legacy UEs may also be backwards-compatible with LTE Release-8.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, in a software module executed by a processor, firmware or any combination thereof. A software module may reside in any form of computer-readable storage medium that is known in the art. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-Ray® disc where disks usually reproduce data magnetically, while discs reproduce data optically with lasers. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the disclosure, other and further aspects of the disclosure may be devised without departing from the basic scope thereof, and the scope thereof is determined by the claims that follow.

What is claimed is:

1. A method for wireless communications, comprising:
    transmitting control information on a control channel during a first subframe to allocate resources for a downlink data channel during a second subframe, wherein the control channel further comprises first and second control channels, wherein the first control channel comprises an indication of a number of symbols utilized for control information on the second control channel;
    re-transmitting the control information on the control channel during the second subframe, wherein the first and second subframes do not overlap in time; and
    transmitting the downlink data channel during the second subframe.

2. The method of claim 1, wherein the control channel comprises bits indicating the allocated resources in the second subframe.

3. The method of claim 1, wherein the control channel is further configured to allocate resources for the downlink data channel in at least a third subframe.

4. The method of claim 1, wherein the transmitting control information further comprises:
   scrambling the control channel using a radio network temporary identifier.

5. The method of claim 1, further comprising:
   transmitting control information on a control channel during a third subframe to allocate uplink resources for an uplink transmission during a fourth subframe.

6. A method for wireless communications, comprising:
   receiving control information on a control channel during a first subframe, the control information allocating resources for a downlink data channel during a second subframe, wherein the control channel further comprises first and second control channels, wherein the first control channel comprises an indication of a number of symbols utilized for control information on the second control channel;
   receiving the control information on the control channel during the second subframe, wherein the first and second subframes do not overlap in time; and
   receiving the downlink data channel during the second subframe.

7. The method of claim 6, wherein the control channel comprises bits indicating the allocated resources in the second subframe.

8. The method of claim 6, wherein the control channel is further configured to allocate resources for the downlink data channel in at least a third subframe.

9. The method of claim 6, wherein the receiving control information further comprises:
   descrambling the control channel using a radio network temporary identifier.

10. The method of claim 6, further comprising:
    receiving control information on a control channel during a third subframe to allocate uplink resources for an uplink transmission during a fourth subframe; and
    transmitting an uplink transmission using the allocated uplink resources in the fourth subframe.

11. An apparatus for wireless communications, comprising:
    means for transmitting control information on a control channel during a first subframe to allocate resources for a downlink data channel during a second subframe, wherein the control channel further comprises first and second control channels, wherein the first control channel comprises an indication of a number of symbols utilized for control information on the second control channel;
    means for re-transmitting the control information on the control channel during the second subframe, wherein the first and second subframes do not overlap in time; and
    means for transmitting the downlink data channel during the second subframe.

12. The apparatus of claim 11, wherein the control channel comprises bits indicating the allocated resources in the second subframe.

13. The apparatus of claim 11, wherein the control channel is further configured to allocate resources for the downlink data channel in at least a third subframe.

14. The apparatus of claim 11, wherein the means for transmitting control information further comprises:
    means for scrambling the control channel using a radio network temporary identifier.

15. The apparatus of claim 11, further comprising:
    means for transmitting control information on a control channel during a third subframe to allocate uplink resources for an uplink transmission during a fourth subframe.

16. An apparatus for wireless communications, comprising:
    means for receiving control information on a control channel during a first subframe, the control information allocating resources for a downlink data channel during a second subframe, wherein the control channel further comprises first and second control channels, wherein the first control channel comprises an indication of a number of symbols utilized for control information on the second control channel;
    means for receiving the control information on the control channel during the second subframe, wherein the first and second subframes do not overlap in time; and
    means for receiving the downlink data channel during the second subframe.

17. The apparatus of claim 16, wherein the control channel comprises bits indicating the allocated resources in the second subframe.

18. The apparatus of claim 16, wherein the control channel is further configured to allocate resources for the downlink data channel in at least a third subframe.

19. The apparatus of claim 16, wherein the means for receiving control information further comprises:
    means for descrambling the control channel using a radio network temporary identifier.

20. The apparatus of claim 16, further comprising:
    means for receiving control information on a control channel during a third subframe to allocate uplink resources for an uplink transmission during a fourth subframe; and
    means for transmitting an uplink transmission using the allocated uplink resources in the fourth subframe.

21. An apparatus for wireless communications, comprising:
    at least one processor configured to:
       transmit control information on a control channel during a first subframe to allocate resources for a downlink data channel during a second subframe, wherein the control channel further comprises first and second control channels, wherein the first control channel comprises an indication of a number of symbols utilized for control information on the second control channel;
       re-transmit the control information on the control channel during the second subframe, wherein the first and second subframes do not overlap in time; and
       transmit the downlink data channel during the second subframe; and
    a memory coupled to the at least one processor.

22. The apparatus of claim 21, wherein the control channel comprises bits indicating the allocated resources in the second subframe.

23. The apparatus of claim 21, wherein the control channel is further configured to allocate resources for the downlink data channel in at least a third subframe.

24. The apparatus of claim 21, wherein the at least one processor is configured to transmit control information is further configured to:
    scramble the control channel using a radio network temporary identifier.

25. The apparatus of claim 21, wherein the at least one processor is further configured to:

transmit control information on a control channel during a third subframe to allocate uplink resources for an uplink transmission during a fourth subframe.

26. An apparatus for wireless communications, comprising:
at least one processor configured to:
receive control information on a control channel during a first subframe, the control information allocating resources for a downlink data channel during a second subframe, wherein the control channel further comprises first and second control channels wherein the first control channel comprises an indication of a number of symbols utilized for control information on the second control channel;
receive the control information on the control channel during the second subframe, wherein the first and second subframes do not overlap in time; and
receive the downlink data channel during the second subframe; and
a memory coupled to the at least one processor.

27. The apparatus of claim 26, wherein the control channel comprises bits indicating the allocated resources in the second subframe.

28. The apparatus of claim 26, wherein the control channel is further configured to allocate resources for the downlink data channel in at least a third subframe.

29. The apparatus of claim 26, wherein the at least one processor configured to receive control information further is further configured to:
descramble the control channel using a radio network temporary identifier.

30. The apparatus of claim 26, wherein the at least one processor is further configured to:
receive control information on a control channel during a third subframe to allocate uplink resources for an uplink transmission during a fourth subframe; and
transmit an uplink transmission using the allocated uplink resources in the fourth subframe.

31. A non-transitory computer-readable medium comprising code for:
transmitting control information on a control channel during a first subframe to allocate resources for a downlink data channel during a second subframe, wherein the control channel further comprises first and second control channels wherein the first control channel comprises an indication of a number of symbols utilized for control information on the second control channel;
re-transmitting the control information on the control channel during the second subframe, wherein the first and second subframes do not overlap in time; and
transmitting the downlink data channel during the second subframe.

32. The non-transitory computer-readable medium of claim 31, wherein the control channel comprises bits indicating the allocated resources in the second subframe.

33. The non-transitory computer-readable medium of claim 31, wherein the control channel is further configured to allocate resources for the downlink data channel in at least a third subframe.

34. The non-transitory computer-readable medium of claim 31, wherein the code for transmitting control information further comprises code for:
scrambling the control channel using a radio network temporary identifier.

35. The non-transitory computer-readable medium of claim 31, wherein the code further comprises code for:
transmitting control information on a control channel during a third subframe to allocate uplink resources for an uplink transmission during a fourth subframe.

36. A non-transitory computer-readable medium comprising code for:
receiving control information on a control channel during a first subframe, the control information allocating resources for a downlink data channel during a second subframe, wherein the control channel further comprises first and second control channels wherein the first control channel comprises an indication of a number of symbols utilized for control information on the second control channel;
receiving the control information on the control channel during the second subframe, wherein the first and second subframes do not overlap in time; and
receiving the downlink data channel during the second subframe.

37. The non-transitory computer-readable medium of claim 36, wherein the control channel comprises bits indicating the allocated resources in the second subframe.

38. The non-transitory computer-readable medium of claim 36, wherein the control channel is further configured to allocate resources for the downlink data channel in at least a third subframe.

39. The non-transitory computer-readable medium of claim 36, wherein the code for receiving control information further comprises code for:
descrambling the control channel using a radio network temporary identifier.

40. The non-transitory computer-readable medium of claim 36, wherein the code further comprises code for:
receiving control information on a control channel during a third subframe to allocate uplink resources for an uplink transmission during a fourth subframe; and
transmitting an uplink transmission using the allocated uplink resources in the fourth subframe.

* * * * *